United States Patent
Shige

(10) Patent No.: US 7,742,268 B2
(45) Date of Patent: Jun. 22, 2010

(54) ELECTRIC VEHICLE CONTROL APPARATUS

(75) Inventor: Masahiro Shige, Kaizuka (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 853 days.

(21) Appl. No.: 11/579,731

(22) PCT Filed: May 26, 2005

(86) PCT No.: PCT/JP2005/010085

§ 371 (c)(1),
(2), (4) Date: Nov. 6, 2006

(87) PCT Pub. No.: WO2005/115792

PCT Pub. Date: Dec. 8, 2005

(65) Prior Publication Data

US 2007/0227788 A1 Oct. 4, 2007

(30) Foreign Application Priority Data

May 27, 2004 (JP) ............................. 2004-158048

(51) Int. Cl.
*H02H 3/08* (2006.01)
*H02H 9/02* (2006.01)
*B60K 1/00* (2006.01)

(52) U.S. Cl. .................................. 361/93.1; 180/65.31

(58) Field of Classification Search ................ 320/101, 320/103, 104; 429/12, 21, 22; 361/23, 24, 361/30, 31, 54, 57, 28, 93.1; 180/65.285, 180/65.29, 65.31, 65.8

See application file for complete search history.

(56) References Cited

U.S. PATENT DOCUMENTS

| 5,929,594 | A | * | 7/1999 | Nonobe et al. | 320/104 |
|---|---|---|---|---|---|
| 6,422,331 | B1 | * | 7/2002 | Ochiai et al. | 180/65.25 |
| 6,656,618 | B2 | * | 12/2003 | Iwase | 429/23 |
| 6,777,909 | B1 | * | 8/2004 | Aberle et al. | 320/104 |
| 6,815,100 | B2 | * | 11/2004 | Aoyagi et al. | 429/13 |
| 6,920,948 | B2 | * | 7/2005 | Sugiura et al. | 180/65.28 |
| 6,973,393 | B2 | * | 12/2005 | Hasuka et al. | 702/63 |
| 7,354,671 | B2 | * | 4/2008 | Ishikawa et al. | 429/23 |
| 7,575,825 | B2 | * | 8/2009 | Sugiura et al. | 429/22 |
| 2002/0109406 | A1 | * | 8/2002 | Aberle et al. | 307/10.1 |
| 2003/0118876 | A1 | * | 6/2003 | Sugiura et al. | 429/9 |

(Continued)

FOREIGN PATENT DOCUMENTS

JP      A-07-123609      5/1995

(Continued)

*Primary Examiner*—Bao Q Vu
*Assistant Examiner*—Jue Zhang
(74) *Attorney, Agent, or Firm*—Oliff & Berridge, PLC

(57) ABSTRACT

Control apparatus of an electric vehicle controls a power supply system of the electric vehicle equipped with a first direct current power supply apparatus for supplying direct current power to a traction inverter, and a second direct current power supply apparatus connected in parallel with the first direct current power supply apparatus via a DC/DC converter. This control apparatus is also provided with a relay for cutting off supply of power from the first direct current power supply apparatus to the traction inverter in synchronization with the operation of the self-protection circuit in the event that the self-protection circuit of the traction inverter operates as a result of overcurrents supplied by the first direct current power supply apparatus.

2 Claims, 1 Drawing Sheet

U.S. PATENT DOCUMENTS

2004/0056633 A1   3/2004   Sugiura et al.
2004/0076860 A1 * 4/2004   Aso ............................ 429/23

FOREIGN PATENT DOCUMENTS

| JP | A-2000-036308 | 2/2000 |
| JP | A 2001-69601  | 3/2001 |
| JP | A 2001-204106 | 7/2001 |
| JP | A 2002-118979 | 7/2002 |
| JP | A 2002-334712 | 11/2002 |
| JP | A 2005-94914  | 4/2005 |
| WO | WO 99/65725   | 12/1999 |

* cited by examiner

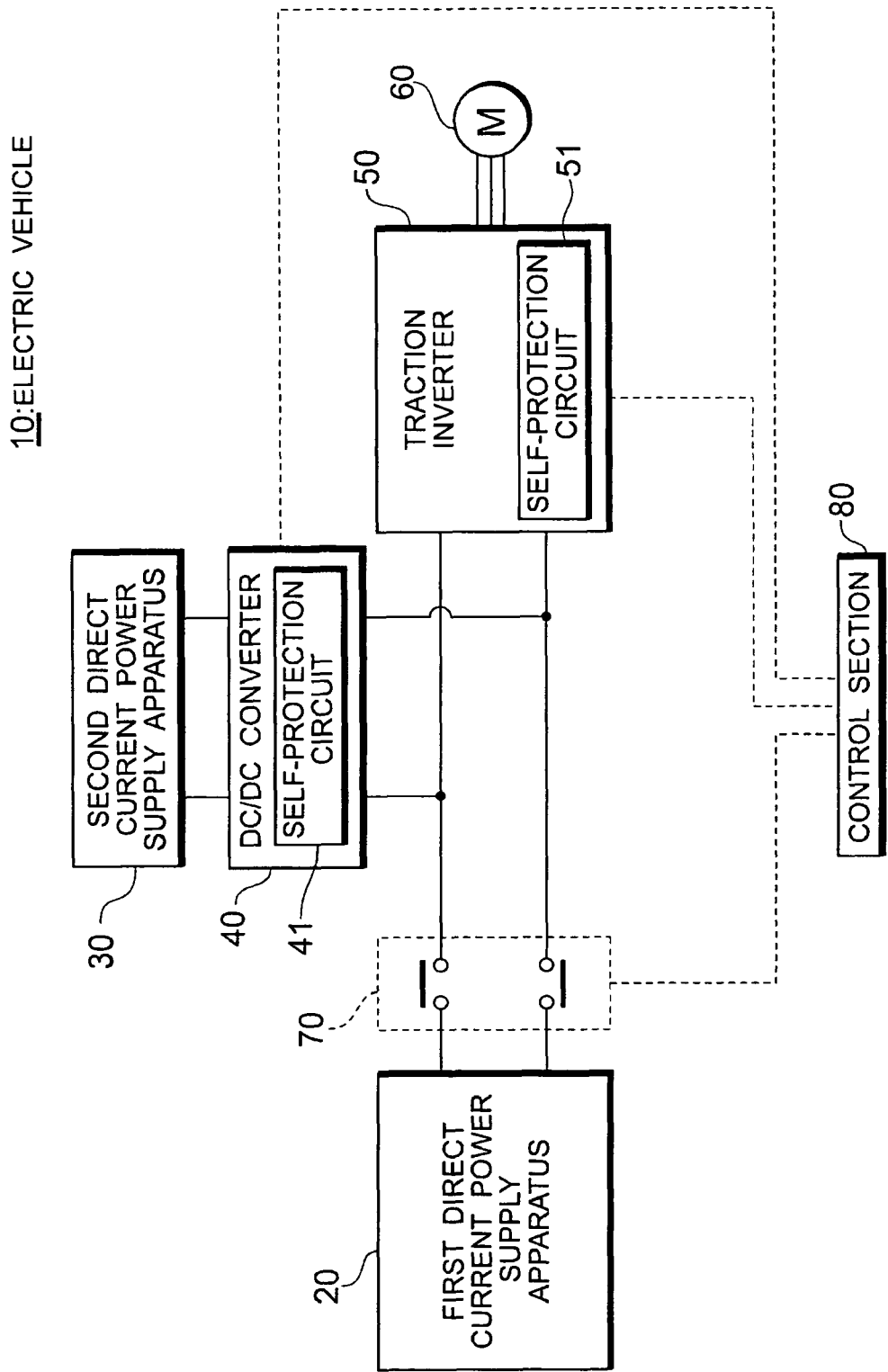

ELECTRIC VEHICLE CONTROL APPARATUS

BACKGROUND OF THE INVENTION

1. Field of the Invention

The present invention relates to an electric vehicle control apparatus, and particularly relates to control in the case where overcurrent self-protection of a traction inverter operates.

2. Description of Related Art

Configurations for hybrid electric vehicles mounted with a fuel cell and secondary cell (storage apparatus) taken as a power supply apparatus where a traction inverter for supplying alternating current power to a traction motor for vehicle travel use, a fuel cell supplying direct current power to the traction inverter, and a secondary cell connected in parallel with the fuel cell via a DC/DC converter are arranged in a power supply system for a vehicle, as disclosed, for example, in Japanese Patent Laid-open Publication No. 2002-118979, are well known. The traction inverter receives a supply of direct current power from one or both of the fuel cell and the secondary cell, converts this to alternating current power, and drives the traction motor.

[Patent Document 1] Japanese Patent Laid-open Publication No. 2002-118979.

SUMMARY OF THE INVENTION

However, in the event that an overcurrent flows in the traction inverter from the fuel cell, when a self-protection circuit of the traction inverter operates and an inverter switching operation is stopped, this overcurrent flows to the DC/DC converter connected in parallel with the fuel cell and there is the fear that the DC/DC converter (or storage apparatus) may be damaged.

The present invention therefore tackles the problem of providing an electric vehicle control apparatus that stops the flowing in of overcurrent to a DC/DC converter in the event that switching is stopped for a traction inverter using overcurrent self-protection.

In order to resolve the aforementioned problems, an electric vehicle control apparatus of the present invention having a first direct current power supply apparatus for supplying direct current power to a traction inverter and a second direct current power supply apparatus connected in parallel with the first direct current power supply apparatus via a DC/DC converter for controlling an electric vehicle power supply system, comprises a self-protection circuit for protecting a circuit of the traction inverter from overcurrents supplied by the first direct current power supply apparatus, and a current cut-off section for cutting off overcurrent flowing in to the DC/DC converter in synchronization with the operation of the self-protection circuit. According to this configuration, it is possible to prevent overcurrents from flowing into a DC/DC converter in the event that switching of a traction inverter is stopped as a result of overcurrent self-protection.

The current cut-off section may be a cut-off section for cutting off supply of power from the first direct current power supply apparatus to the traction inverter, for example, in synchronization with the operation of the self-protection circuit, or may be a switching stopping section for stopping a switching operation of the DC/DC converter in synchronization with the operation of the self-protection circuit.

An electric vehicle control apparatus of a first aspect of the present invention is a control apparatus having a first direct current power supply apparatus for supplying direct current power to a traction inverter and a second direct current power supply apparatus connected in parallel with the first direct current power supply apparatus via a DC/DC converter, for controlling an electric vehicle power supply system, that may be provided with a cut-off section for cutting off supply of power from the first direct current power supply apparatus to the traction inverter in the event that the self-protection circuit of the traction inverter operates due to overcurrent supplied by the first direct current power supply apparatus. According to this configuration, it is possible to prevent overcurrent from flowing into the DC/DC converter.

It is preferable for the cut-off section to forcibly restart the supply of power from the first direct current power supply apparatus to the traction inverter after a predetermined period of time elapses from the start of operation of the self-protection circuit of the traction inverter. If there is a temporary overcurrent, the system is restored in a short time, and normal travel of the vehicle can be continued.

An electric vehicle control apparatus of a second aspect of the present invention is a control apparatus having a first direct current power supply apparatus for supplying direct current power to a traction inverter and a second direct current power supply apparatus connected in parallel with the first direct current power supply apparatus via a DC/DC converter, for controlling an electric vehicle power supply system, that may be provided with a switching stopping section causing a switching operation of the DC/DC converter to stop in synchronization with the operation of the self-protection circuit of the traction inverter in the event that the self-protection circuit of the traction inverter operates due to overcurrent supplied by the first direct current power supply apparatus. As the stopping of the DC/DC converter switching operation has a superior response, it is possible for the self-protection circuit of the DC/DC converter to be made to operate without delays in the starting operation of the self-protection circuit of the traction inverter.

Namely, it is also preferable to adopt a configuration where the switching stopping section forcibly restarts the switching operation of the DC/DC converter after a predetermined period of time has elapsed from the start of operation of the self-protection circuit of the traction inverter. If there is a temporary overcurrent, the system is restored in a short time, and normal travel of the vehicle can be continued.

BRIEF DESCRIPTION OF THE DRAWINGS

FIG. 1 is a system configuration view for an electric vehicle power supply system of a first embodiment.

DETAILED DESCRIPTION OF PREFERRED EMBODIMENT

FIG. 1 shows a system configuration centering on an electric vehicle power supply system of the first embodiment. A traction inverter 50 for supplying alternating current power to a traction motor (power load) 60, a first direct current power supply apparatus 20 for supplying direct current power to a traction inverter 50, a second direct current power supply apparatus 30 connected in parallel with the first direct current power supply apparatus 20 via a DC/DC converter 40, a relay (cut-off section) 70 cutting-off a supply of power from the first direct current power supply apparatus 20 to the traction inverter 50, and a control section 80 for carrying out control of the power supply system are arranged as a power supply system of an electric vehicle 10.

The first direct current power supply apparatus 20 is a power supply apparatus functioning as a main power supply for the system and is preferably, for example, a fuel cell. The fuel cell is an apparatus for converting chemical energy in the possession of the fuel gas and oxidation gas into electrical energy and has the advantages of high energy efficiency, having few toxic exhaust gases, and not using petroleum fuel. The second direct current power supply apparatus 30 is power supply apparatus functioning as an auxiliary power supply for the system, and is preferably a secondary cell such as, for example, a nickel cadmium storage cell, a nickel hydrogen storage cell, or a lithium secondary cell etc., or a storage apparatus such as a capacitor etc., capable of being charged and discharged. By configuring a hybrid power supply system mounted with a first direct current power supply apparatus 20 and a second direct current power supply apparatus 30, it is then possible to, for example, convert kinetic energy recuperated at the time of vehicle braking to electrical energy for storage in the second direct current power supply apparatus 30 so that when instantaneous power is required for starting or acceleration etc., a shortfall in power supplied by the first direct current power supply apparatus 20 is compensated for by the second direct current power supply apparatus 30.

The traction motor 60 is an electric motor for obtaining driving force for advancement of the vehicle and is constructed from, for example, a three-phase synchronous motor, etc. The traction inverter 50 is equipped with a three-phase bridge circuit constructed from, for example, six power transistors, with direct current power being converted to alternating current power (three-phase alternating current) by a switching operation of the power transistors and supplied to the traction motor 60. Control of the power transistors is carried out by the control section 80, and information necessary in switching control of the control section 80 is transmitted from the traction inverter 50. The traction inverter 50 adjusts amplitude and frequency of the three-phase alternating current necessary for adjusting the output torque and rotational speed of the traction motor 60 to the desired value in response to a request instruction from the control section 80. The traction inverter 50 is equipped with a self-protection circuit 51 for protecting the circuit from overcurrents. When an overcurrent is detected, self-protection circuit 51 stops the switching operation of the traction inverter 50.

In addition to functioning as a voltage control section for adjusting the output voltage of the first direct current power supply apparatus 20 to correspond to the operational state of the system, the DC/DC converter 40 steps down the direct current voltage outputted by the first direct current power supply apparatus 20 and charges the second direct current power supply apparatus 30 for auxiliary power supply use. Power conversion control of the DC/DC converter 40 is controlled by the control section 80. The DC/DC converter 40 is equipped with a self-protection circuit 41 for protecting the circuit from overcurrents. When an overcurrent is detected, self-protection circuit 41 stops the switching operation of the DC/DC converter 40.

In the above configuration, in the event that the self-protection circuit 51 operates as a result of overcurrent supplied from the first direct current power supply apparatus 20 to the traction inverter 50, the control section 80 opens the relay 70 in synchronization with the operation (stopping of switching of the traction inverter 50) of the self-protection circuit 51 and cuts the supply of power from the first direct current power supply apparatus 20 to the traction inverter 50. As a result, it is possible to prevent overcurrent from flowing in to the DC/DC converter 40. Further, it is possible to avoid stopping (operation of the self-protection circuit 41) of switching of the DC/DC converter 40. In a further method, in the event that the self-protection circuit 51 operates, for example, due to overcurrent supplied from the first direct current power supply apparatus 20 to the traction inverter 50, control is exerted in such a manner as to stop the switching operation of the DC/DC converter 40 by operating the self-protection circuit 41 of the DC/DC converter 40 in synchronization with the operation of the self-protection circuit 51 of the traction inverter 50. In this case, a configuration may be adopted where the self-protection circuit 41 operates in synchronization with the operation of the self-protection circuit 51 as a result of the self-protection circuits 41, 51 mutually transmitting and receiving control signals, or a configuration may be adopted where the control section 80 detecting operation of the self-protection circuit 51 causes the self-protection circuit 41 to operate in synchronization with this. Further, it is also possible for the switching operation of the DC/DC converter 40 to be halted by a forced stopping circuit (not shown) separate from the self-protection circuit 41. The self-protection circuit 41 or forced stopping circuit etc. described above may function as a switching stopping section for the DC/DC converter 40. A slight response delay may occur in accompaniment with the mechanical operation for the opening and closing of the relay 70 but the response is superior if switching of the self-protection circuit 41 is stopped.

Further, it is also possible to adopt a configuration where the relay 70 is forcibly closed and operation of the self-protection circuit 41 is forcibly stopped (the switching operation of the DC/DC converter 40 is forcibly restarted) after a predetermined period of time has elapsed from the self-protection circuit 51 starting to operate. Namely, it is also possible to adopt a configuration where a switching stopping section forcibly restarts the switching operation of the DC/DC converter 40 after a predetermined period of time has elapsed from the start of operation of the self-protection circuit 51 of the traction inverter 50. If the overcurrent flowing into the traction inverter 50 is transient, it is possible to return to normal travel in a short period of time.

INDUSTRIAL APPLICABILITY

According to the present invention, it is possible to prevent overcurrents from flowing into a DC/DC converter in the event that switching of a traction inverter is stopped as a result of overcurrent self-protection. It is also possible for the system to be reset in a short time.

What is claimed is:

1. An electric vehicle control apparatus comprising:
    a first direct current power supply apparatus for supplying direct current power to a traction inverter;
    a second direct current power supply apparatus connected in parallel with the first direct current power supply apparatus via a DC/DC converter;
    a first self-protection circuit for protecting a circuit of the traction inverter from overcurrents supplied by the first direct current power supply apparatus; and
    a second self-protection circuit for stopping a switching operation of the DC/DC converter in synchronization with operation of the first self-protection circuit so as to cut off overcurrent flowing into the DC/DC converter.

2. The electric vehicle control apparatus according to claim 1,
    wherein the second self-protection circuit restarts the switching operation of the DC/DC converter after a predetermined period of time elapses from the first self-protection circuit of the traction inverter starting to operate.

* * * * *